United States Patent
Jul et al.

(10) Patent No.: US 9,179,378 B2
(45) Date of Patent: Nov. 3, 2015

(54) FEMTOCELL BASE STATION, AND A METHOD OF SELECTING CARRIER FREQUENCY BAND OF A FEMTOCELL BASE STATION

(75) Inventors: Eric B. Jul, Roskilde (DK); Holger Claussen, Straffan (IE)

(73) Assignee: Alcatel Lucent, Boulogne-Billancourt (FR)

( * ) Notice: Subject to any disclaimer, the term of this patent is extended or adjusted under 35 U.S.C. 154(b) by 429 days.

(21) Appl. No.: 13/820,371

(22) PCT Filed: Aug. 11, 2011

(86) PCT No.: PCT/EP2011/004022
§ 371 (c)(1),
(2), (4) Date: May 15, 2013

(87) PCT Pub. No.: WO2012/028254
PCT Pub. Date: Mar. 8, 2012

(65) Prior Publication Data
US 2013/0225179 A1 Aug. 29, 2013

(30) Foreign Application Priority Data
Sep. 3, 2010 (EP) .................................... 10290471

(51) Int. Cl.
*H04W 36/06* (2009.01)
*H04W 16/16* (2009.01)
*H04W 84/04* (2009.01)

(52) U.S. Cl.
CPC .............. *H04W 36/06* (2013.01); *H04W 16/16* (2013.01); *H04W 84/045* (2013.01)

(58) Field of Classification Search
CPC ..... H04W 36/00; H04W 36/06; H04W 36/20; H04W 16/16; H04W 84/045; H04W 52/244
USPC ................................................... 455/438, 444
See application file for complete search history.

(56) References Cited

U.S. PATENT DOCUMENTS 8,285,293 B2    10/2012  Claussen et al.
8,594,647 B2    11/2013  Huang
(Continued)

FOREIGN PATENT DOCUMENTS

CN      101674600       3/2010
CN      101742520       6/2010
EP      2 190 236 A1    5/2010

OTHER PUBLICATIONS

Imran Ashraf et al. "Improving Energy Efficiency of Femtocell Base Stations via User Activity Detection," IEEE, XP031706720, pp. 1-5, Apr. 18, 2010.
(Continued)

*Primary Examiner* — George Eng
*Assistant Examiner* — Marcus Hammonds
(74) *Attorney, Agent, or Firm* — Fay Sharpe LLP (57) ABSTRACT

A method is provided of selecting carrier frequency band of a femtocell base station that provides a femtocell and resides within a macrocell provided by a macrocell base station. The method comprises: the femtocell base station operating at the carrier frequency band of the macrocell, detecting that a user terminal connected to the macrocell base station at an carrier frequency band of the macrocell is in or close to the femtocell, and the femtocell base station switching its carrier frequency band to one not allocated to the macrocell.

11 Claims, 5 Drawing Sheets

(56) References Cited

U.S. PATENT DOCUMENTS

| | | | |
|---|---|---|---|
| 8,755,749 B2* | 6/2014 | Yavuz et al. | 455/63.1 |
| 2007/0213067 A1 | 9/2007 | Li et al. | |
| 2010/0130222 A1* | 5/2010 | Claussen et al. | 455/452.2 |
| 2011/0051684 A1* | 3/2011 | Li et al. | 370/331 |
| 2012/0244864 A1* | 9/2012 | Fujii | 455/436 |

OTHER PUBLICATIONS

International Search Report for PCT/EP2011/004022 dated Dec. 7, 2011.

* cited by examiner

FEMTOCELL BASE STATION, AND A METHOD OF SELECTING CARRIER FREQUENCY BAND OF A FEMTOCELL BASE STATION

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as small cells, microcells, picocells, or femtocells, but we use the term femtocells generically for cells that are smaller than macrocells. One way to establish a femtocell is to provide a femtocell base station that operates within a relatively limited range within the coverage area of a macrocell. One example of use of a femtocell base station is to provide wireless communication coverage within a building.

The femtocell base station is of a relatively low transmit power and hence each femtocell is of a small coverage area compared to a macrocell. A typical coverage range is tens of metres.

Femtocell base stations have auto-configuring properties so as to support plug-and-play deployment by users, for example in which femto base stations may integrate themselves into an existing macrocell network so as to connect to the core network of the macrocell network.

Femtocell base stations are intended primarily for users belonging to a particular home or office. Femtocell base stations may be private access or public access. In femtocell base stations that are private access, access is restricted to only registered users, for example family members or particular groups of employees. In femtocell base stations that are public access, other users may also use the femtocell base station, subject to certain restrictions to protect the Quality of Service received by registered users.

One known type of Femtocell base station uses a broadband Internet Protocol connection as "backhaul", namely for connecting to the core network. One type of broadband Internet Protocol connection is a Digital Subscriber Line (DSL). The DSL connects a DSL transmitter-receiver ("transceiver") of the femtocell base station to the core network. The DSL allows voice calls and other services provided via the femtocell base station to be supported. The femtocell base station also includes a radio frequency (RF) transceiver connected to an antenna for radio communications. An alternative to such a wired broadband backhaul is to have a wireless backhaul.

Femtocell base stations are sometimes referred to as femtos.

Current third generation (3G) cellular telecommunications networks consist of cells known as macrocells that each covers a large area ranging from one to one hundred square kilometres. Macrocells are provided by respective macrocell base stations. In such a network, there is a fixed limit on capacity, and as traffic increases, be it voice and/or data traffic, this capacity limit may be reached. Expanding the capacity of the network by adding additional macrocell base stations would be expensive and technically more complex as strategic positioning of new macrocell base stations is required. In contrast femtos offer a simpler way to increase capacity, avoiding the need for detailed network planning to strategically position the further base stations.

In addition to their auto-configuring plug-and-play properties mentioned above, femtos may include some functionality traditionally provided by the core network. One example is a Universal Mobile Telecommunications System (UMTS) Base Station Router (BSR) which includes some functions of a macrocell base station (NodeB in UMTS terminology), radio network controller (RNC), Serving GPRS Support Node (SGSN) and Gateway GPRS Support Node, where GPRS denotes General Packet Radio System.

Femtocells significantly increase the call capacity of a network. Within a macrocell coverage area hundreds of femtocells may be deployed, which has the effect of increasing capacity by several orders of magnitude.

As mentioned above private access femtos permit use only by registered user terminals. If a private access femto uses the same carrier frequency band as the macrocell within which the femto resides, then the femtocell is effectively a coverage hole to user terminals that not registered with that femto. This is because such a user terminal cannot maintain its connection with the macrocell base station as it moves into the femtocell coverage area because the signals from the femto interferes with the signals from the macrocell base station resulting in a call connection to the user terminal being dropped.

The known way to avoid these coverage holes is to allocate a carrier frequency band for use by the femtos that is different from the carrier frequency band of the macrocell. Accordingly, as the frequency band dedicated to the femtos is different to that of the macrocell base station, coverage holes are avoided. Signals at the frequency band of the femtos do not interfere with signals at the frequency band of the macrocell base station.

SUMMARY

The reader is referred to the appended independent claims. Some preferred features are laid out in the dependent claims.

An example of the present invention is a method of selecting carrier frequency band of a femtocell base station that provides a femtocell and resides within a macrocell provided by a macrocell base station. The method comprises: the femtocell base station operating at the carrier frequency band of the macrocell, detecting that a user terminal connected to the macrocell base station at an carrier frequency band of the macrocell is in or close to the femtocell, and the femtocell base station switching its carrier frequency band to one not allocated to the macrocell.

Preferably the femtocell base station does said switching of its carrier band to one not allocated to the macrocell upon determinating that the user terminal is not connectable to the femtocell base station.

Some preferred embodiments provide interference avoidance by reducing femto-to-femto interference on a shared carrier frequency band by femtos making intelligent use of the frequency band of a macrocell within which it resides. A femto detects whether a user terminal that must remain connected to the macrocell enters the femtocell and if so switches to the shared femto carrier frequency band so as to not interfere with that user terminal's connection.

Preferred embodiments of the present invention allow private access femtos to make use of the macrocell's carrier frequency band but with any particular hole in macrocell coverage due to a femto being removed as and when performance of the macrocell may be affected in providing service to user terminals. In consequence, macrocell bandwidth may be used more efficiently. In preferred embodiments interference between femtos is reduced as use is made of the ability of the femtos to use different carrier frequency bands. In consequence, in some embodiments, a higher density of femtocells may be deployed than otherwise.

In some embodiments, upon a second femtocell base station interfering with the femtocell base station by using the same carrier frequency band, the interference is reduced. The interference may be reduced by the femtocell base station switching to the other frequency band after a given pseudo-random timer has expired, or the interference may be reduced by the femtocell base station handing over connections with user terminals to the macrocell base station then entering a dormant state.

BRIEF DESCRIPTION OF THE DRAWINGS

Embodiments of the present invention will now be described by way of example and with reference to the drawings, in which:

FIGS. 4 to 9 are illustrations of use of the macrocell carrier frequency band and a shared femto carrier frequency band by user terminals at various points in time, more specifically:

DETAILED DESCRIPTION

The inventor realised that a problem with the known approach mentioned above of having separate frequency bands for the macrocell on the one hand and the femtos on the other hand was that the macrocell frequency band is poorly utilised. He realised that because the macrocell is relatively large but its capacity is limited, at any particular time most of the macrocell coverage area will not have any active user terminals. Also as this approach limits the radio spectrum available to femtos, dense deployments of femtos suffer from interference issues.

The inventor realised that in regions of the macrocell without users connected to the macrocell, the macrocell frequency band could be made use of by the femtos. He realised that it is possible in some circumstances to allow femtos to use the macrocell carrier frequency band but switch to the shared femto carrier frequency band should interference become a problem to a user terminal that is connected to the macrocell base station via the macrocell frequency band. In consequence, greater use is made of the macrocell frequency band and femto to femto interference on the shared femto frequency band is reduced as at least one femto is using the macrocell frequency band instead.

This approach is opportunistic in the sense that the femto infringes on a macrocell's exclusive use of a frequency band in the expectation that the active call connection of the user terminal with the femto will not cause interference problems to the macrocell. However, if the femto detects that its use of the macrocell frequency band may cause an interference problem to communications of the user terminal with the macrocell base station, then the femto switches to using the shared femto frequency band instead.

It is envisaged that many femtos will be able to make use of the macrocell frequency band without causing interference problems. It may be considered that the femtos each borrow part of the macrocell coverage area at that frequency band. The performance of the macrocell is not harmed as a "borrower" femto leaves that frequency band immediately if about to cause interference detrimental to communications with the macrocell. It can be considered that from the perspective of the macrocell base station, the macrocell base station gets an illusion of exclusive use of the macrocell frequency band.

We now describe a network including femtocell base stations then look in greater detail at how a femto may use the macrocell frequency band.

Network

Figure 1:
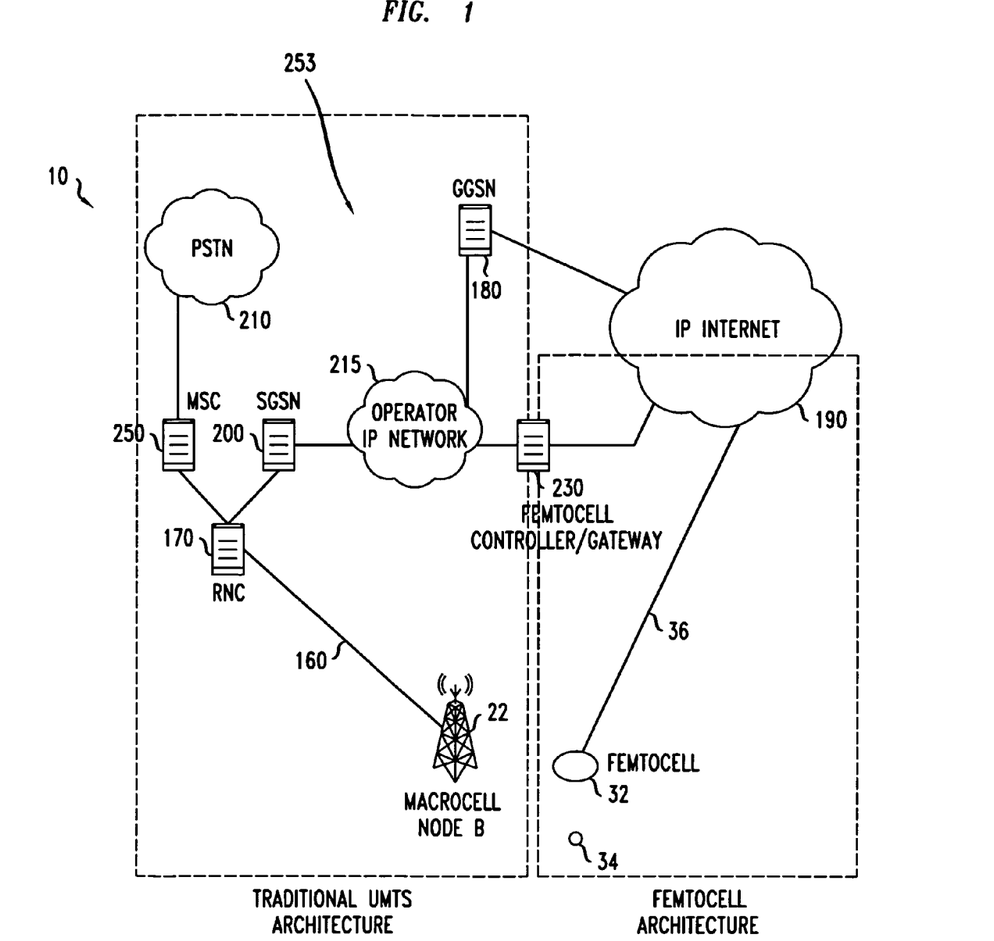
FIG. 1 is a diagram illustrating a wireless communications network according to a first embodiment of the present invention.
Figure 2:
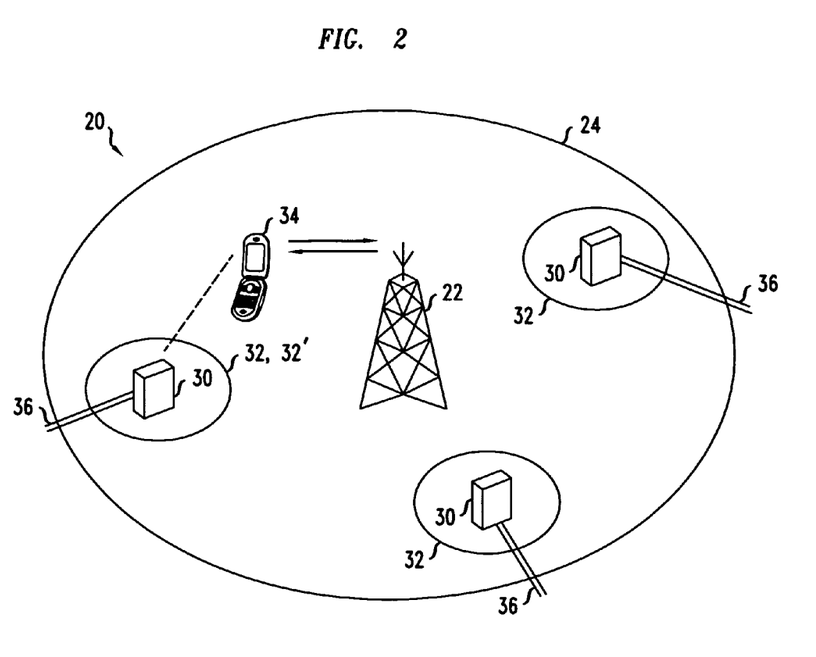
FIG. 2 is a diagram illustrating an example femtocell base station deployment within one macrocell shown in FIG. 1.

As shown in FIGS. 1 and 2, a network 10 for wireless communications, through which a user terminal 34 may roam, includes two types of base station, namely macrocell base stations and femtocell base stations (the latter being sometimes called "femtos"). One macrocell base station 22 is shown in FIGS. 1 and 2 for simplicity. Each macrocell base station has a radio coverage area 24 that is often referred to as a macrocell. The geographic extent of the macrocell 24 depends on the capabilities of the macrocell base station 22 and the surrounding geography.

Within the macrocell 24, each femtocell base station 30 provides wireless communications within a corresponding femtocell 32. A femtocell is a radio coverage area. The radio coverage area of the femtocell 32 is much less than that of the macrocell 24. For example, the femtocell 32 corresponds in size to a user's office or home.

As shown in FIG. 1, the network 10 is managed by a radio network controller, RNC, 170. The radio network controller, RNC, 170 controls the operation, for example by communicating with macrocell base stations 22 via a backhaul communications link 160. The radio network controller 170 maintains a neighbour list which includes information about the geographical relationship between cells supported by base stations. In addition, the radio network controller 170 maintains location information which provides information on the location of the user equipment within the wireless communications system 10. The radio network controller 170 is operable to route traffic via circuit-switched and packet-switched networks. For circuit-switched traffic, a mobile switching centre 250 is provided with which the radio network controller 170 may communicate. The mobile switching centre 250 communicates with a circuit-switched network such as a public switched telephone network (PSTN) 210. For packet-switched traffic, the network controller 170 communicates with serving general packet radio service support nodes (SG-SNs) 220 and a gateway general packet radio support node (GGSN) 180. The GGSN then communicates with a packet-switch core 190 such as, for example, the Internet.

The MSC 250, SGSN 220, GGSN 180 and operator IP network constitute a so-called core network 253. The SGSN 220 and GGSN 180 are connected by an operator IP network 215 to a femtocell controller/gateway 230.

The femtocell controller/gateway 230 is connected via the Internet 190 to the femtocell base stations 32 and can be considered to act as an RNC in controlling handovers to femtos. These connections to the femtocell controller/gateway 230 are broadband Internet Protocol connections ("backhaul") connections.

In FIG. 2, three femtocell base stations 30 and corresponding femtocells 32 are shown for simplicity.

It is possible for a mobile terminal 34 within the macrocell 24 to communicate with the macrocell base station 22 in known manner. When the mobile terminal 34 enters into a femtocell 32 for which the mobile terminal is registered for communications within the femtocell base station 30, it is desirable to handover the connection with the mobile terminal from the macrocell to the femtocell. In the example shown in FIG. 2, the user of mobile terminal 34 is a preferred user of the nearest 32' of the femtocells 32.

As shown in FIG. 2, the femtocell base stations 30 are connected via the broadband Internet Protocol connections ("backhaul") 36 to the core network (not shown in FIG. 2) and hence the rest of the telecommunications "world" (not shown in FIG. 2). The "backhaul" connections 36 allow communications between the femtocell base stations 30 through the core network (not shown). The macrocell base station is also connected to the core network (not shown in FIG. 2).

Femtocell Base Station

Figure 3:
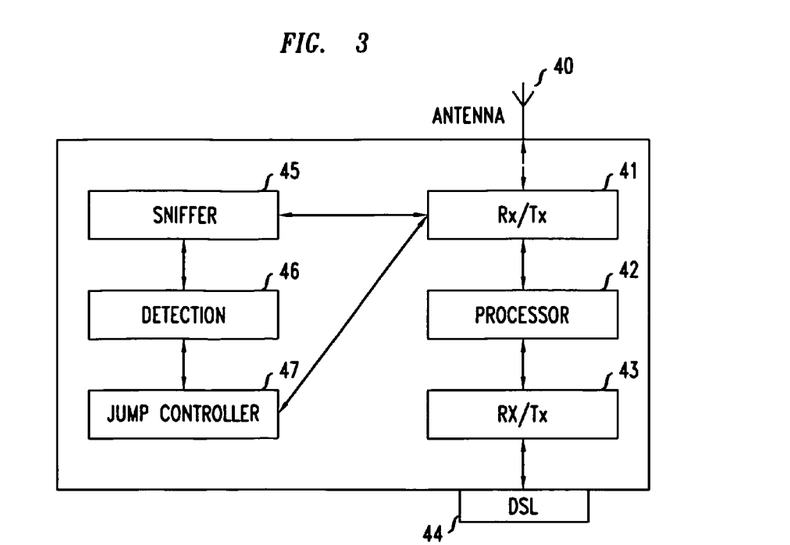
FIG. 3 is an illustration of the structure of the femtocell base station in more detail.

As shown in FIG. 3, the femto 30 includes an antenna 40 connected to a radio interface 41 for generation of signals for radio transmission and reception of signals received via the antenna 40. The radio interface 41 is connected to a call control processor 42 which is also connected via a DSL transmitter-receiver unit 43 to a Digital Subscriber Line (DSL) interface 44. The DSL interface 44 provides an internet backhaul to the femto.

The radio interface 41 is connected to a sniffer 45 that detects received signals in the macrocell frequency band and is explained in more detail below. The sniffer is connected to a detector 46 of received signal level which is connected to a frequency band controller 47. The operation of these is explained in more detail below.

A sniffer is a lower power—consuming component of the femto that is able to detect an active call between the macrocell base station and a user terminal. If a user terminal connected to the macrocell base station approaches the femtocell, then the femto detects a rise in received power in the uplink frequency band. Upon determination by the detector 46 that this rise, which may be considered a noise rise, exceeds a given threshold, the user terminal is deemed close enough to be within the femtocell.

A sniffer is described in a paper by Asraf I, Ho L T W, and Claussen H entitled "Improving Energy Efficiency of Femtocell Base Stations via User Activity Detection", Proceedings of the IEEE WCNC, Sydney Australia, April 2010.

The femto has co-channel operation, in other words it uses a transmission radio frequency that is different to its reception radio frequency, both being within a carrier frequency band.

Example Scenario

FIGS. 4 to 9 are illustrations of example scenarios of use of the macrocell carrier frequency band and a shared femto carrier frequency band by user terminals at a sequence of points in time. In these Figures, for ease of understanding, the macrocell frequency band 50 is illustrated as a first plane, and the shared femto frequency band 51 is illustrated as a second plane. Six user terminals, denoted 61, 62, 63, 74, 75, 76, are shown.

Figure 4:
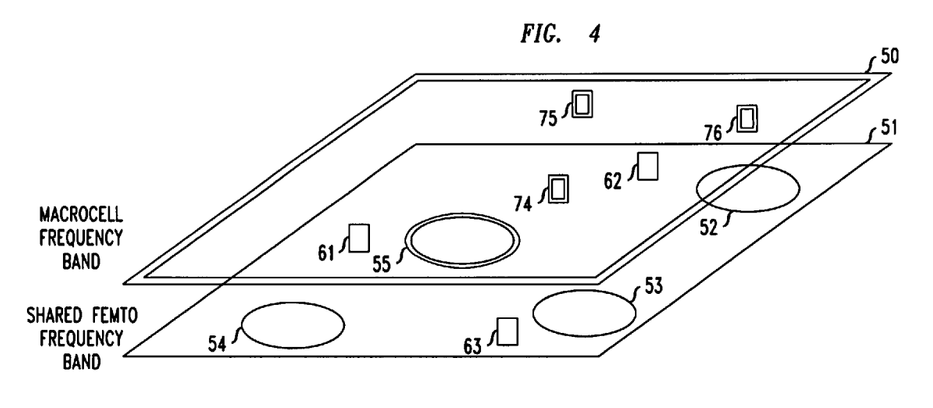
FIG. 4 shows a femto using the frequency band of the macrocell.

As shown in FIG. 4, at that time, there are three active user terminals 74, 75, 76 operating at the frequency band of the macrocell and three 61, 62, 63 currently configured to operate at the shared femto frequency band. Four femtocells are shown, three (denoted 52, 53, 54) of which currently operate in the shared femto frequency band, and one (denoted 55) of which currently operates at the macrocell frequency band. This one femto 55 currently operates at the macrocell frequency band because its sniffer at the macrocell frequency band has detected since start-up only that there is no active user terminal within the femtocell.

User Terminal is Registered with the Femto

Figure 5:
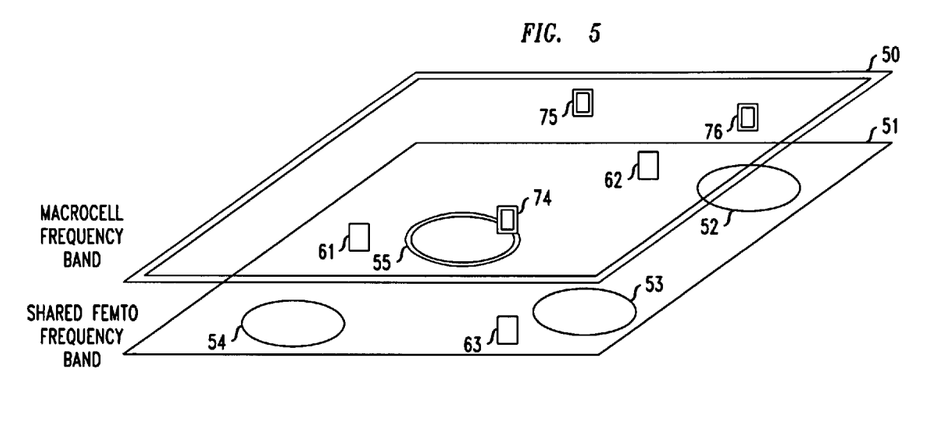
FIG. 5 shows a user terminal that is registered to use the femto moving into the femtocell.

As shown in FIG. 5, one 74 of the active user terminals operating at the macrocell frequency band moves into the femtocell 55, the femtocell base station (not shown, that provides femtocell 55 operating in the macrocell frequency band) detects the user terminal using its sniffer. The femtocell base station checks whether either the user terminal 74 is registered with that femtocell base station so is allowed to connect to it, or is not registered with that femtocell so is not allowed to connect to it.

In this example, the user terminal is registered with that femto, so the femto powers on its processing functions and pilot signal transmission. The user terminal 74 then receives signals from the femtocell 55 that are stronger than signals from the macrocell base station. The user terminal 74 measures the received signal strengths and sends a measurement report to the macrocell base station causing the macrocell base station to handover the call connection to the femtocell 55. Thereafter the user terminal is call-connected to the femtocell 55 using the macrocell frequency band.

In effect the femtocell is active, the macrocell base station is not used for the call, and the femtocell causes a hole in the macrocell coverage area. Provided there are no user terminals in the hole that are not registered with, and so cannot connect to, the femtocell, the existence of this macrocell coverage hole is not a problem. It can be considered that the femtocell 55 has borrowed part of the coverage area of the macrocell at the macrocell frequency band. Should another user terminal that is registered with the femto enter the femtocell 55, it will likewise be handed over to the femto thereby freeing up macrocell capacity.

User Terminal in Active Mode is not Registered with the Femto

A problem to be resolved is when a user terminal moves into the femtocell causing a coverage hole as regards the macrocell, but the user terminal is not registered (is "unregistered") with the femto.

Figure 6:
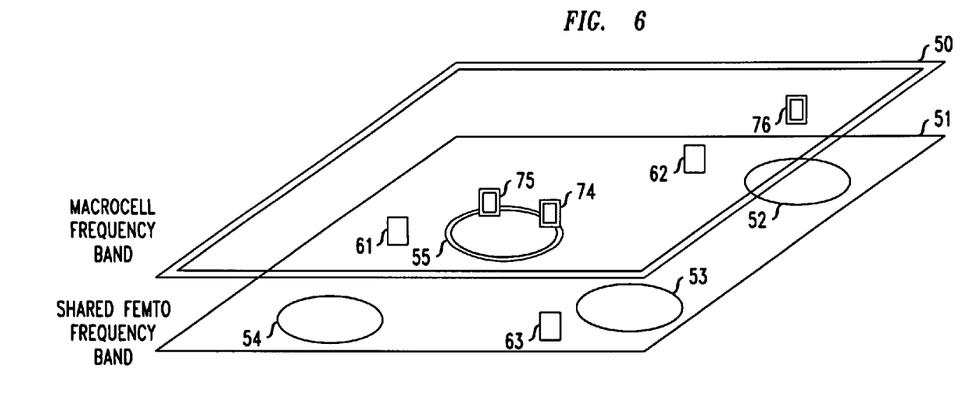
FIG. 6 shows a further user terminal that is not registered to use the femto moving into the femtocell.

As shown in FIG. 6, more specifically, an unregistered user terminal 75 entering the femtocell 55 detects the pilot signal from the femto in the femtocell 55 and reports this to the macrocell base station as part of normal monitoring procedures. The macrocell base station then attempts to handover its connection to the user terminal 75 to the femtocell 55 base station. This handover attempt is unsuccessful because the user terminal is not registered with femtocell 55 base station.

Figure 7:
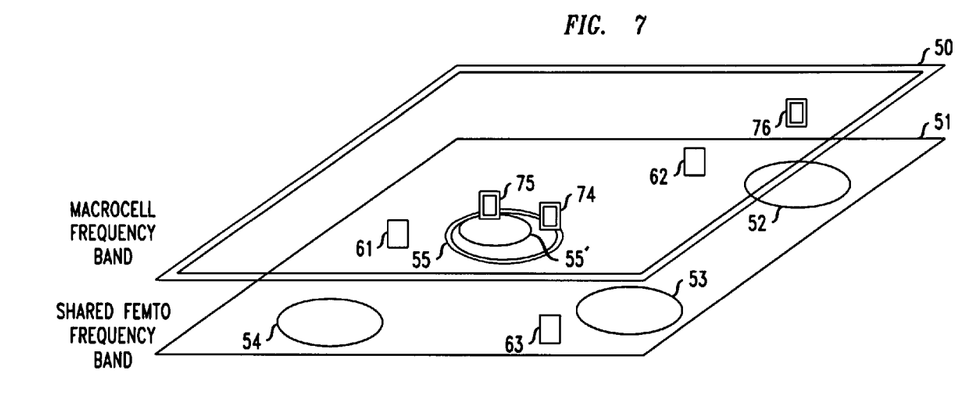
FIG. 7 shows the femto reducing its transmit power so as to prepare to shift to using the shared femto frequency band.

As shown in FIG. 7, in the case where the unregistered user terminal 75 is active, in other words in a call connection, this situation is resolved by the femtocell 55 reducing its signal strength thus causing handover of its registered user terminal 74 to the macrocell. (In FIG. 7, the reduced signal strength and hence effective femtocell coverage area is indicated by 55').

Figure 8:
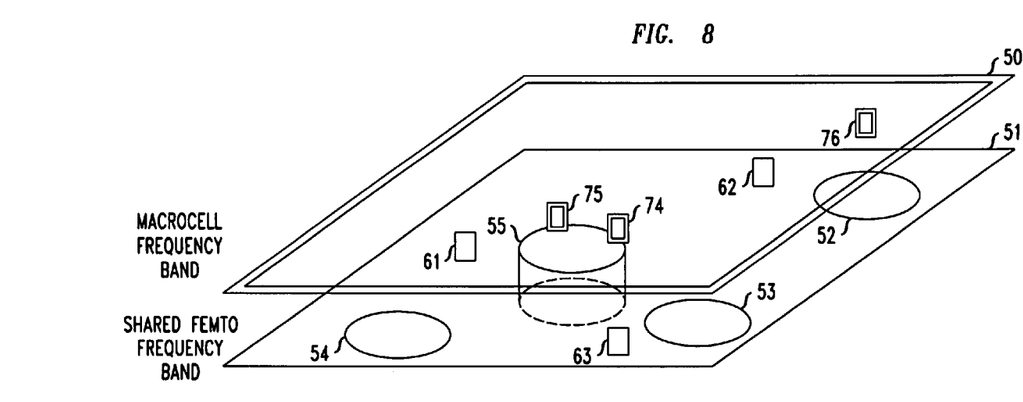
FIG. 8 shows the femto shifting to using the shared femto frequency band.

As shown in FIG. 8, then, as no registered user terminal is using the femtocell so no call connection will be lost, the femtocell shifts from using the macrocell frequency band 55 to using the shared femto frequency band 51. This has the effect of removing the hole in the macrocell at the macrocell frequency band.

Figure 9:
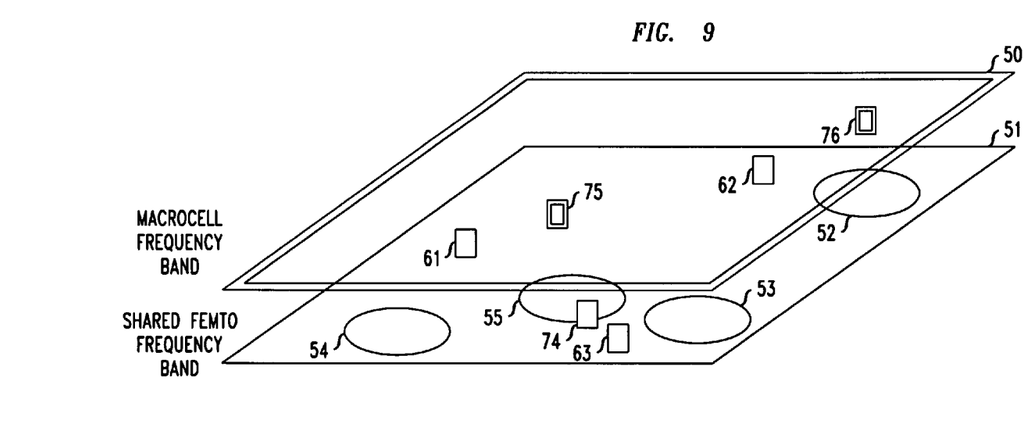
FIG. 9 shows the femto using the shared femto frequency band.

As shown in FIG. 9, the user terminal 75 that is unregistered with the femtocell no longer detects signals from the femtocell and so remains connected to the macrocell. As the femtocell uses the shared femto frequency band, the registered user terminal 74 gets handed back to the femtocell. As both the femtocell and the registered terminal 74 have been switched to the shared femto frequency band, some capacity of the macrocell in the macrocell frequency band is freed up.

Femto Switching Back to the Macrocell Frequency Band

The femto that has switched to the shared femto frequency band continues to sniff the macrocell frequency band in order to detect whether there is still a user terminal unregistered with the femtocell but currently in active mode and within the femtocell. If there is not, the femtocell switches back to operating at the macrocell frequency band. In a similar embodiment, a waiting time between that detection and switching back is introduced in order to reduce so-called hysteresis problems resulting from repeatedly switching between the frequency bands giving rise to delays, for example when an unregistered user terminal is moving along the edge of the femtocell.

User Terminal in Idle Mode is not Registered with the Femto

In the situation that the unregistered user terminal 75 is in idle mode rather than active mode, the unregistered user terminal 75 detects pilot signal transmissions from the femto in the macrocell frequency band and so seeks to transfer its idle mode connection (in other words relocate) to the femto. Accordingly the user terminal sends an authorisation request to the femto. However, because the user terminal is not registered with the femto, the authorisation request is refused. Nevertheless the femto has been identified as operating at the macrocell frequency band so causing a hole in the macrocell coverage area at the macrocell frequency band. Accordingly, the femto is transferred to the shared femto frequency band.

In this example there happens to be no registered user terminal in active mode to transfer to macrocell connection before changing the femotocell's operating frequency band.

Thereafter the femto that has switched to the shared femto frequency band continues to sniff the macrocell frequency band in order to detect whether there is still a user terminal unregistered with the femtocell within the femtocell. However, as the unregistered user terminal is in idle mode, this user terminal is not transmitting and hence is not detected by the sniffing.

In consequence, waiting times between that detection and switching back is introduced in order to reduce problems of repeatedly switching between the frequency bands.

Without such waiting times, on switching back to the macrocell frequency band, the unregistered user terminal in idle mode will almost immediately seek to attach to the femtocell, causing the femtocell to switch to the shared femtocell frequency band. Accordingly such attempts to switch to the macrocell frequency band will be repeatedly thwarted and there is wasteful signalling involved with each attempt.

To address this, a waiting time between the detection and switching back is introduced, specifically the waiting time is increased after each attempt, for example using an "exponential backoff", namely doubling the waiting time after each attempt up to a maximum waiting time limit. This quickly reduces the wasted signalling caused by an unregistered user terminal in idle mode entering the femtocell and remaining stationary thereafter.

Some Variants

Frequency Band Joint Operation

In an otherwise similar embodiment, the femtocell may for a time operate both frequency bands simultaneously. Accordingly, when switching from the macrocell frequency band, a user terminal in active mode connected to the femtocell is handed over directly to the shared frequency band, instead of via the macrocell.

Addressing Interference Between Femtos

In another similar embodiment to that described above with reference to the Figures, each femtocell is allocated a short pseudo-random waiting time before switching frequency bands. Where two femtocells are interfering with each other, each of the two femtocells decides, after its respective waiting time, whether or not it is still necessary to switch frequency band. This prevents two femtocells that are interfering with each other from repeatedly and frequently both switching together, between the macrocell frequency band and shared frequency band, and so perpetuating the interference. By using the pseudo-random waiting times, a second femto may well find that a first femto has already switched to the other frequency band so the problem of interference has been alleviated and a switching of the second femto is not required.

In other similar embodiments to that described above with reference to the Figures, should a first active femtocell base station detect interference with a second femtocell base station, the first femtocell base station sniffs the frequency band that it is not currently operating at (the macrocell frequency band or the shared femto frequency band), and attempts to switch to that frequency band. If this switching is not possible, the two(or more) interfering femtocell base stations address this issue using another technique, namely power control, in order to reduce interference. If this is still problematic, one of the femtocells forces handover to the macrocell of the registered user terminal that has the highest required power level. This forced handover may be achieved by reducing power, so triggering the handover to the macrocell base station to occur. Alternatively, a user terminal may be commanded to hand over directly to the macrocell operating at the macrocell frequency band.

The forced handover process is repeated until a femtocell base station has handed over all its active user terminals, the femtocell base station then entering idle mode, in other words a dormant state, so as to no longer produce interference. However, the femtocell base station continues to sniff the macrocell frequency band in order to determine when there are no unregistered user terminals both in active mode and in the femtocell, in which case the femto both switches to operating at the macrocell frequency band and powers up so as to be handed over active user terminals registered with that femto. If the femto cannot switch to the macrocell frequency band, the femto sniffs the shared femto frequency band so as to detect whether it can operate with acceptable interference from other femtos on the shared femto frequency band. If the femto can operate using the shared femto frequency band, the femto checks for active registered user terminals, and powers up upon finding at least one active registered user terminal. This causes handover of these user terminal(s) to that femto.

General

The present invention may be embodied in other specific forms without departing from its essential characteristics. For example, in an alternative embodiment, upon a user terminal in active mode that is connected to the macrocell base station moving close to the femtocell, the user terminal is detected by a noise rise in the power received in the uplink frequency band of the femtocell base station, and in response the femtocell base station switches away from using the macrocell's frequency band. In this embodiment, a determination of whether the user terminal is connectable to the femtocell base station is not undertaken as a handover attempt is not triggered and so handover signalling does not occur.

The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of selecting carrier frequency band of a femtocell base station that provides a femtocell and resides within a macrocell provided by a macrocell base station, the method comprising:
the femtocell base station operating at a carrier frequency band of the macrocell comprising detecting that a first user terminal is in or close to the femtocell, determining that said first user terminal is connectable to the femtocell base station and so connecting said first user terminal to the femtocell base station using the carrier frequency band allocated to the macrocell;
detecting that a second user terminal connected to the macrocell base station at the carrier frequency band of the macrocell is in or close to the femtocell;
wherein the femtocell base station switches its carrier frequency band to one not allocated to the macrocell upon determining that the second user terminal is not connectable to the femtocell base station, in which said first user terminal is handed over to the macrocell base station at the carrier frequency band of the macrocell, whereupon the femtocell base station is switched to the frequency band not allocated to the macrocell and then said first user terminal is handed over to the femtocell base station.

2. A method according to claim 1, in which said first user terminal is handed over to the macrocell base station by reducing its signal strength.

3. A method according to claim 1, in which upon detecting said first user terminal, the femtocell base station transits from a dormant mode to an active mode in which the femtocell base station makes pilot signal transmissions.

4. A method according to claim 1, in which the femtocell base station is capable of operating at the carrier frequency band of the macrocell and the carrier frequency band not allocated to the macrocell at a time so upon determining that the second user terminal is not connectable to the femtocell base station, said first user terminal is transferred at the femtocell base station from the carrier frequency band of the macrocell to the carrier frequency band not allocated to the macrocell.

5. A method according to claim 1, in which the carrier frequency band not allocated to the macrocell is a shared carrier frequency band allocated to femtocell base stations.

6. A method according to claim 1, in which upon detecting that the second user terminal is no longer in the femtocell, the femtocell reverts to using the carrier frequency band of the macrocell.

7. A method according to claim 1, in which the femtocell reverts to using the carrier frequency band of the macrocell after a given timer has expired.

8. A method according to claim 1, in which the second user terminal is in idle mode, and the detecting that the second user terminal is in the femtocell comprises the femtocell base station receiving a request from the second user terminal to idle-mode connect to the femtocell base station.

9. A method according to claim 1, in which a user terminal that is registered to use the femtocell base station and is in the femtocell is deemed connectable to the femtocell base station.

10. A method according to claim 1 in which upon a second femtocell base station interfering with the femtocell base station by using the same carrier frequency band, the interference is reduced.

11. A femtocell base station comprising a carrier frequency band selector configured to select carrier frequency bands,
the femtocell base station being configured to operate initially at a carrier frequency band of the macrocell in which said operating initially at the carrier frequency band of the macrocell comprises a detector detecting that a first user terminal is in or close to the femtocell, a processor determining that another user terminal is connectable to the femtocell base station and the processor effecting connection of said another user terminal to the femtocell base station at the carrier frequency band allocated to the macrocell;
the femtocell base station further comprises the detector configured to detect that a second user terminal connected to the macrocell base station at the carrier frequency band of the macrocell is in or close to the femtocell;
wherein:
the selector being configured to switch the carrier frequency band of femtocell base station to one not allocated to the macrocell;
the femtocell base station comprising a processor configured to determine that the second user terminal is not connectable to the femtocell base station;
the selector being configured to perform said switch of the carrier frequency dependent upon the determination that the second user terminal is not connectable to the femtocell base station, where upon said first user terminal is handed over to the macrocell base station at the carrier frequency band of the macrocell, whereupon the femtocell base station is switched to the frequency band not allocated to the macrocell and then said first user terminal is handed over to the femtocell base station.

* * * * *